US012613515B2

(12) United States Patent
Shpaisman et al.

(10) Patent No.: US 12,613,515 B2
(45) Date of Patent: Apr. 28, 2026

(54) SYSTEM AND METHOD FOR DEFECT MITIGATION USING DATA ANALYSIS

(71) Applicant: Orbotech Ltd., Yavne (IL)

(72) Inventors: Nava Shpaisman, Kedumim (IL); Bronislav Kupershtein, Beer Yaakov (IL)

(73) Assignee: Orbotech Ltd., Yavne (IL)

( * ) Notice: Subject to any disclaimer, the term of this patent is extended or adjusted under 35 U.S.C. 154(b) by 605 days.

(21) Appl. No.: 17/979,386

(22) Filed: Nov. 2, 2022

(65) Prior Publication Data

US 2024/0142958 A1     May 2, 2024

(51) Int. Cl.
G05B 19/418        (2006.01)
G06T 7/00          (2017.01)

(52) U.S. Cl.
CPC ...... G05B 19/41875 (2013.01); G06T 7/0004 (2013.01); G05B 2219/32182 (2013.01); G06T 2207/30141 (2013.01)

(58) Field of Classification Search
CPC .... G05B 19/41875; G05B 2219/32182; G05B 2207/30141; G05B 2219/45026; G06T 7/0004; G06T 2207/30141
See application file for complete search history.

(56) References Cited

U.S. PATENT DOCUMENTS 4,787,143 A    11/1988  Yagi et al.
5,608,526 A     3/1997  Piwonka-Corle et al.
5,999,310 A    12/1999  Shafer et al.
6,297,880 B1   10/2001  Rosencwaig et al.
7,058,474 B2    6/2006  Ganot et al.
7,203,355 B2    4/2007  Levi et al.
7,206,443 B1    4/2007  Duvdevani et al.
7,345,825 B2    3/2008  Chuang et al.
(Continued)

FOREIGN PATENT DOCUMENTS

JP        2013026501 A     2/2013
KR        100253301 B1     6/2000
(Continued)

OTHER PUBLICATIONS

Israel Patent Office, International Search Report and Written Opinion received in International Application No. PCT/IL2023/051117, Jan. 25, 2024, 16 pages.

*Primary Examiner* — Yuhui R Pan
(74) *Attorney, Agent, or Firm* — Suiter Swantz IP

(57)        ABSTRACT

A method for defect mitigation is disclosed. The method may include receiving defect data for one or more defects of one or more samples. The defect data may include a defect location, a defect size, a defect shape, or a relationship between the defect and a component of the one or more samples. The method may include identifying at least one defect as a disqualifying defect based on the received defect data and one or more predetermined thresholds. Upon identifying the defect as a disqualifying defect, the method may include generating a tool readable index configured to cause one or more downstream fabrications tool to adjust one or more downstream fabrication steps corresponding to the disqualifying defect based on the generated tool readable index. The method may include providing the generated tool readable index to the one or more downstream fabrication tool.

18 Claims, 4 Drawing Sheets

(56)                    References Cited

U.S. PATENT DOCUMENTS

| | | | |
|---|---|---|---|
| 7,525,649 | B1 | 4/2009 | Leong et al. |
| 7,817,333 | B2 | 10/2010 | Chen |
| 7,957,066 | B2 | 6/2011 | Armstrong et al. |
| 8,077,307 | B2 | 12/2011 | Pertzov et al. |
| 8,139,844 | B2 | 3/2012 | Chen et al. |
| 8,964,274 | B2 | 2/2015 | Heinemann et al. |
| 9,228,943 | B2 | 1/2016 | Wang et al. |
| 9,279,774 | B2 | 3/2016 | Romanovsky et al. |
| 10,338,002 | B1 | 7/2019 | Danen et al. |
| 2004/0030517 | A1* | 2/2004 | Rumsey ................ H01L 23/544 257/E23.179 |
| 2005/0250254 | A1 | 11/2005 | Ishizu et al. |
| 2008/0124906 | A1* | 5/2008 | Moon ................... H10D 89/10 438/584 |
| 2017/0356955 | A1* | 12/2017 | Sumikawa ......... G01R 31/2894 |

FOREIGN PATENT DOCUMENTS

| | | | |
|---|---|---|---|
| KR | 20030057213 | A | 7/2003 |
| KR | 20090105569 | A | 10/2009 |

* cited by examiner

200

202 — RECEIVE DEFECT DATA FOR ONE OR MORE DEFECTS OF ONE OR MORE SAMPLES

204 — IDENTIFY AT LEAST ONE DEFECT OF THE ONE OR MORE DEFECTS AS A DISQUALIFYING DEFECT

206 — GENERATE AN INDEX

208 — PROVIDE THE GENERATED INDEX TO A DOWNSTREAM FABRICATION SUB-SYSTEM

SYSTEM AND METHOD FOR DEFECT MITIGATION USING DATA ANALYSIS

TECHNICAL FIELD

The present invention generally relates to defect mitigation, and, more particularly, to a system and method for defect mitigation using data analysis.

BACKGROUND

As the demand for electronic circuits having ever-small device features continues to increase, the need for improved defect mitigation techniques for printed circuit boards (PCBs) continues to grow. Current printed circuit board defect mitigation techniques utilize defect data to adjust one or more characteristics of previous PCB fabrication processes/tools. However, one or more downstream processes/tools may be affected by the defect and may lead to the creation of additional defects. For example, during fabrication of the PCB, contamination of the development solution may lead to the creation of an additional defect because the photosensitive material may penetrate within the vias/trenches of the electrical circuit. As such, it would be advantageous to provide system and method to remedy the shortcomings of the approaches identified above.

SUMMARY

A system is disclosed, in accordance with one or more embodiments of the present disclosure. In embodiments, the system includes a characterization sub-system configured to perform inspection of one or more samples to generate defect data for one or more defects of the one or more samples. In embodiments, the system further includes one or more controllers communicatively coupled to the characterization sub-system, the one or more controllers including one or more processors configured to execute a set of program instructions stored in memory, the set of program instructions configured to cause the one or more processors to: receive the defect data from the characterization sub-system, the defect data including one of a defect location, a defect size, a defect shape, or a relationship between the defect and a component of the one or more samples; identify at least one defect of the one or more defects as a disqualifying defect based on the received defect data and one or more predetermined thresholds; upon identifying the defect as a disqualifying defect, generate a tool readable index, the generated tool readable index configured to cause one or more downstream fabrication tools to adjust one or more downstream fabrication steps corresponding to the disqualifying defect based on the generated tool readable index; and provide the generated tool readable index to the one or more downstream fabrication tools.

A system is disclosed, in accordance with one or more embodiments of the present disclosure. In embodiments, the system includes one or more controllers communicatively coupled to the characterization sub-system, the one or more controllers including one or more processors configured to execute a set of program instructions stored in memory, the set of program instructions configured to cause the one or more processors to: receive the defect data from the characterization sub-system, the defect data including one of a defect location, a defect size, a defect shape, or a relationship between the defect and a component of the one or more samples; identify at least one defect of the one or more defects as a disqualifying defect based on the received defect data and one or more predetermined thresholds; upon identifying the defect as a disqualifying defect, generate a tool readable index, the generated tool readable index configured to cause one or more downstream fabrication tools to adjust one or more downstream fabrication steps corresponding to the disqualifying defect based on the generated tool readable index; and provide the generated tool readable index to the one or more downstream fabrication tools.

A method is disclosed, in accordance with one or more embodiments of the present disclosure. In embodiments, the method includes receiving defect data for one or more defects of one or more samples from a characterization sub-system, the defect data including one of a defect location, a defect size, a defect shape, or a relationship between the defect and a component of the one or more samples. In embodiments, the method includes identifying at least one defect of the one or more defects as a disqualifying defect based on the received defect data and one or more predetermined thresholds. In embodiments, upon identifying the defect as a disqualifying defect, the method includes generating a tool readable index, the generated tool readable index configured to cause one or more downstream fabrications tool to adjust one or more downstream fabrication steps corresponding to the disqualifying defect based on the generated tool readable index. In embodiments, the method includes providing the generated tool readable index to the one or more downstream fabrication tool.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the disclosure may be better understood by those skilled in the art by reference to the accompanying figures.

DETAILED DESCRIPTION

The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

Reference will now be made in detail to the subject matter disclosed, which is illustrated in the accompanying drawings.

Embodiments of the present disclosure are directed to a system and method for defect mitigation using data analysis. In particular, embodiments of the present disclosure are directed to a system and method for preventing defect accumulation by defect detection. For example, the system may be configured to issue a tool readable index that can be decoded by the next tool in the process, where the next tool in the process may be able to skip the defected area in accordance with the issued tool readable index.

Figure 1A:
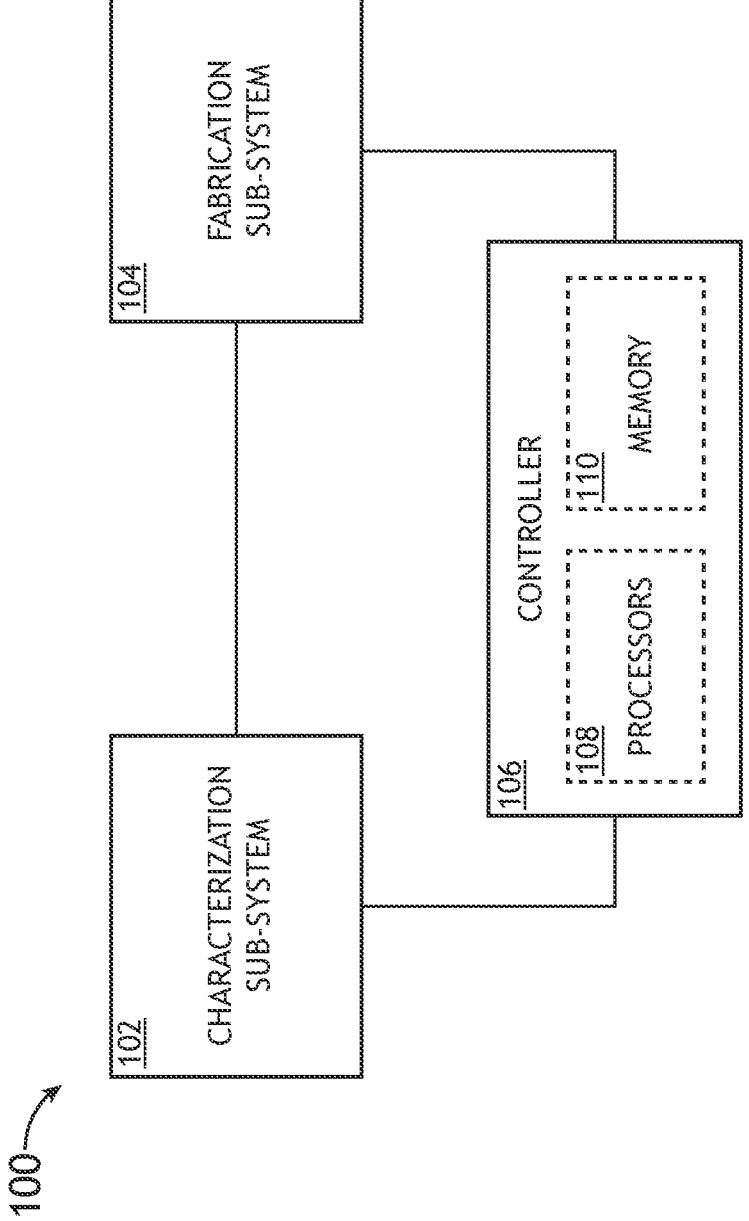
FIG. 1A illustrates a block diagram view of a defect mitigation system, in accordance with one or more embodiments of the present disclosure.

FIG. 1A illustrates a block diagram of a defect mitigation system 100, in accordance with one or more embodiments of the present disclosure.

In embodiments, the system 100 includes a characterization sub-system 102 configured for defect inspection of one or more samples. It is noted herein that the characterization sub-system 102 may include an inspection sub-system. The characterization sub-system 102 may include any inspection sub-system 102 known in the art including, but not limited to, an automated optical inspection tool (AOI tool).

Automated optical inspection systems are generally discussed in U.S. Pat. No. 8,077,307, issued on Dec. 13, 2011; U.S. Pat. No. 7,203,355, issued on Apr. 10, 2007; and U.S. Pat. No. 7,206,443, issued on Apr. 17, 2007, which are each incorporated herein by reference in the entirety.

Figure 3:
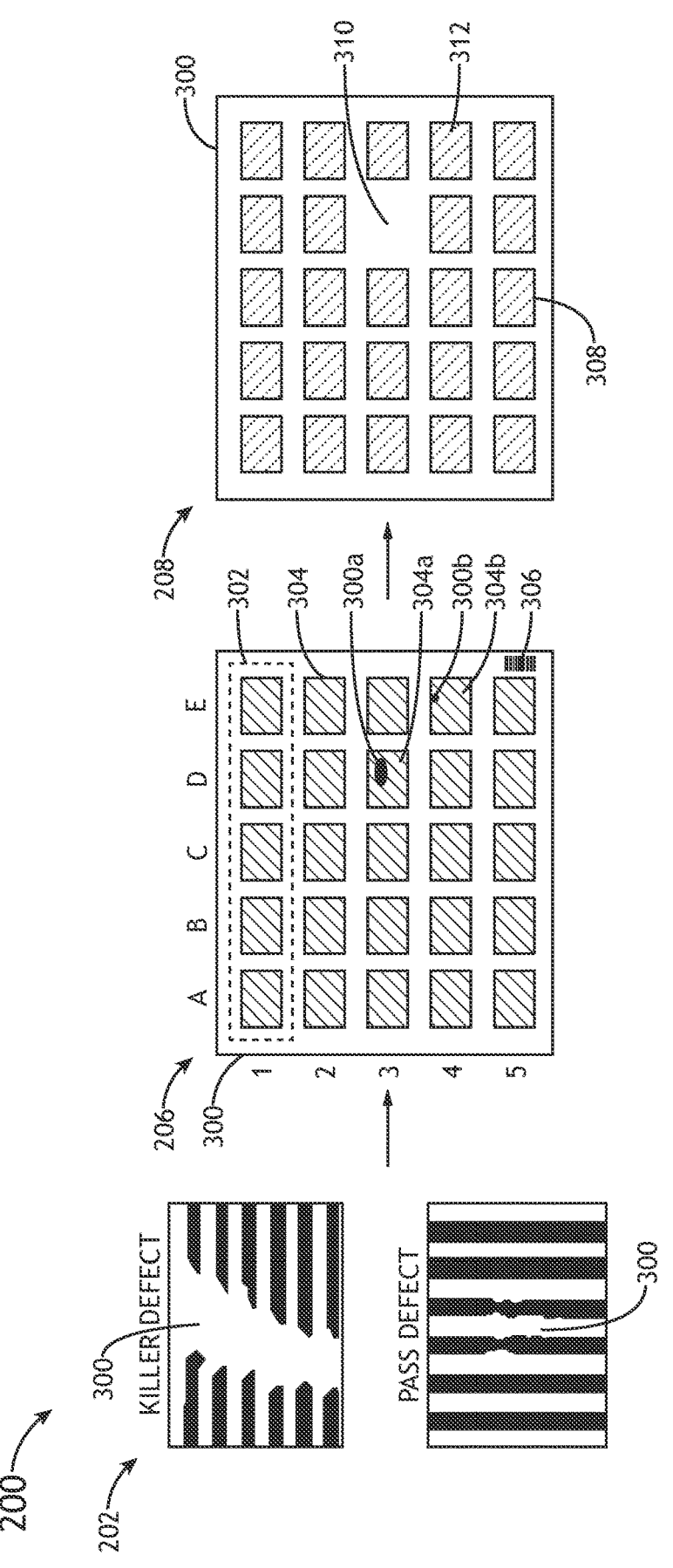
FIG. 3 illustrates a process flow diagram depicting a method of mitigating defects within the system, in accordance with one or more embodiments of the present disclosure.

The characterization sub-system 102 may provide various types of characterization data related to the defects of the one or more samples. For example, the characterization sub-system 102 may provide defect characterization data. For instance, the characterization sub-system 102 may provide the location, size, shape, number, or type of defect of the one or more samples. Further, the characterization sub-system 102 may provide a relationship between the defect and a particular component of the sample. In this regard, as shown in FIG. 3, a barcode 306 may be generated, where the barcode 306 may include the relationship between a panel 300 and a defect 300a, as discussed further herein.

In embodiments, the system 100 includes one or more fabrication sub-systems 104 (e.g., one or more fabrication tools 104). The fabrication sub-system 104 may include any type of sample fabrication sub-system 104 known in the art including, but not limited to, a photolithography tool, a laser direct imaging tool, an etching tool, a drilling tool (e.g., laser drilling tool or mechanical drilling tool), a solder mask printing tool, a computer-aided manufacturing (CAM) design tool, or the like.

Fabrication tools are generally discussed in U.S. Pat. No. 8,964,274, issued on Feb. 24, 2015 and U.S. Pat. No. 7,058,474, issued on Jun. 6, 2006, which are both incorporated herein by reference in the entirety.

In embodiments, the system 100 includes one or more controllers 106 communicatively coupled to the characterization sub-system 102 and the one or more fabrication sub-systems 104. The controller 106 includes one or more processors 108 configured to execute program instructions maintained on a memory medium 110 (memory 110). The one or more processors 108 of the controller 106 may execute any of the various process steps described throughout the present disclosure. Further, the one or more processors 108 of the controller 106 may be configured to receive data including, but not limited to, imagery data associated with the one or more samples 112 from the inspection sub-system 102 (or an external characterization tool).

Figure 1B:
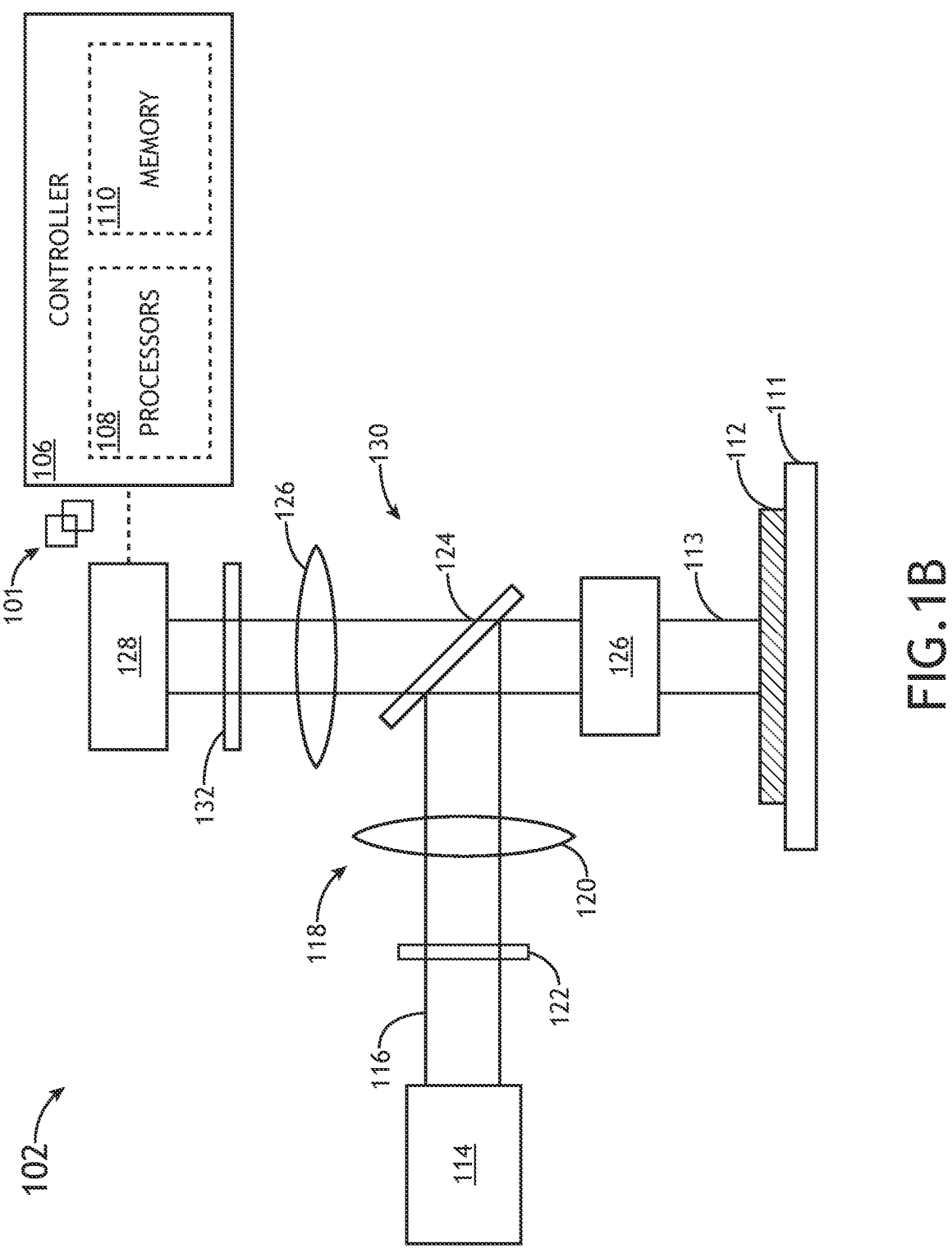
FIG. 1B illustrates a simplified schematic view of an inspection sub-system of the defect mitigation system, in accordance with one or more embodiments of the present disclosure.

FIG. 1B is a conceptual view illustrating the characterization sub-system 102, in accordance with one or more embodiments of the present disclosure.

In embodiments, the characterization sub-system 102 includes an inspection sub-system 102 configured to perform defect inspection of one or more samples 112. For example, the inspection sub-system 102 may be configured to acquire one or more inspection images 101 of one or more portions of the one or more samples 112. The sample may include any type of sample including, but not limited to, a printed circuit board (PCB), a flat panel display (FPD), a wafer, and the like.

In embodiments, the one or more samples 112 are disposed on the sample stage assembly 111 to facilitate movement of the one or more samples 112. The sample stage assembly 111 may include any stage assembly 111 known in the art.

In embodiments, the inspection sub-system 102 includes an illumination source 114 configured to generate one or more illumination beams 116. The illumination source 114 may be configured to emit one or more illuminations beams 116 of one or more selected wavelengths of light including, but not limited to, vacuum ultraviolet radiation (VUV), deep ultraviolet radiation (DUV), ultraviolet (UV) radiation, visible radiation, or infrared (IR) radiation. In embodiments, the illumination source 114 may include a spectrally-tunable illumination source to generate one or more illumination beams 116 having a tunable spectrum.

In embodiments, the illumination source 114 directs the illumination beam 116 to one or more samples 112 via an illumination pathway 118. The illumination pathway 118 may include one or more lenses 120 or additional illumination optical components 122 suitable for modifying and/or conditioning the illumination beam 116. For example, the one or more illumination optical components 122 may include, but are not limited to, one or more polarizers, one or more filters, one or more splitters, one or more diffusers, one or more homogenizers, one or more apodizers, one or more shapers, one or more shutters (e.g., mechanical shutters, electro-optical shutters, acousto-optic shutters, or the like), one or more aperture stops, and/or one or more field stops.

In embodiments, the inspection sub-system 102 includes an electro-optic modulator 126. The electro-optic modulator 126 may be disposed in the illumination path of the illumination beam 116 from the illumination source 114. The electro-optic modulator 126 may modulate one or more characteristics of the illumination beam 116. During operation, light transmits through portions of the electro-optical modulator 126, and defects can be detected by observing changes in the reflected or transmitted light. Electro-optic modulators are generally discussed in U.S. Pat. No. 7,817, 333, issued on Oct. 19, 2019, which is incorporated by reference in the entirety.

In embodiments, the detector 128 is configured to capture radiation emanating from the one or more samples 112 (e.g., sample light 113) through a collection pathway 130. For example, the collection pathway 130 may include, but is not required to include, the electro-optic modulator 126, a collection lens (e.g., an objective lens), or one or more additional collection pathway lenses 132. In this regard, the detector 128 may receive radiation reflected or scattered (e.g., via specular reflection, diffuse reflection, and the like) from the one or more samples 112 or generated by the one or more samples 112 (e.g., luminescence associated with absorption of the illumination 308, or the like).

The collection pathway 130 may further include any number of collection optical components 134 to direct and/or modify illumination collected by the electro-optic modulator 126 including, but not limited to one or more collection pathway lenses 132, one or more filters, one or more polarizers, or one or more blocks. Additionally, the collection pathway 130 may include field stops to control the spatial extent of the sample imaged onto the detector 128 or aperture stops to control the angular extent of illumination from the sample used to generate an image on the detector 128. In embodiments, the collection pathway 130 includes an aperture stop located in a plane conjugate to the back focal plane of an optical element to provide telecentric imaging of the sample. In embodiments, the inspection sub-system 102 includes a beam splitter 124 oriented such that the electro-optic modulator 126 may simultaneously direct the illumination beam 116 to the one or more samples 112 and collect radiation emanating from the one or more samples 112.

The detector 128 may include any type of optical detector suitable for measuring illumination received from the panel 300. For example, the detector 128 may include, but is not limited to, a charge coupled device (CCD) detector, a time delay and integration (TDI) detector, a photomultiplier tube (PMT), an avalanche photodiode (APD), a complementary metal-oxide-semiconductor (CMOS) sensor, or the like. In embodiments, the detector 128 may include a spectroscopic detector suitable for identifying wavelengths of light emanating from the one or more samples 112.

Although embodiments of the present disclosure are directed to a printed circuit board inspection system, it is contemplated that the system 100 may be embodied as a wafer inspection system or wafer metrology system. Therefore, the above description shall not be construed as limiting the scope of the present disclosure. Wafer inspection/metrology systems are generally discussed in U.S. Pat. No. 9,279,774, issued on Mar. 8, 2016; U.S. Pat. No. 7,957,066, issued on Jun. 7, 2011; U.S. Pat. No. 7,345,825, issued on Mar. 18, 2008; U.S. Pat. No. 5,999,310, issued on Dec. 7, 1999; U.S. Pat. No. 7,525,649, issued on Apr. 28, 2009; U.S. Pat. No. 9,228,943, issued on Jan. 5, 2016; U.S. Pat. No. 5,608,526, issued on Mar. 4, 1997; U.S. Pat. No. 6,297,880, issued on Oct. 2, 2001, which are each incorporated herein by reference in their entirety.

Figure 2:
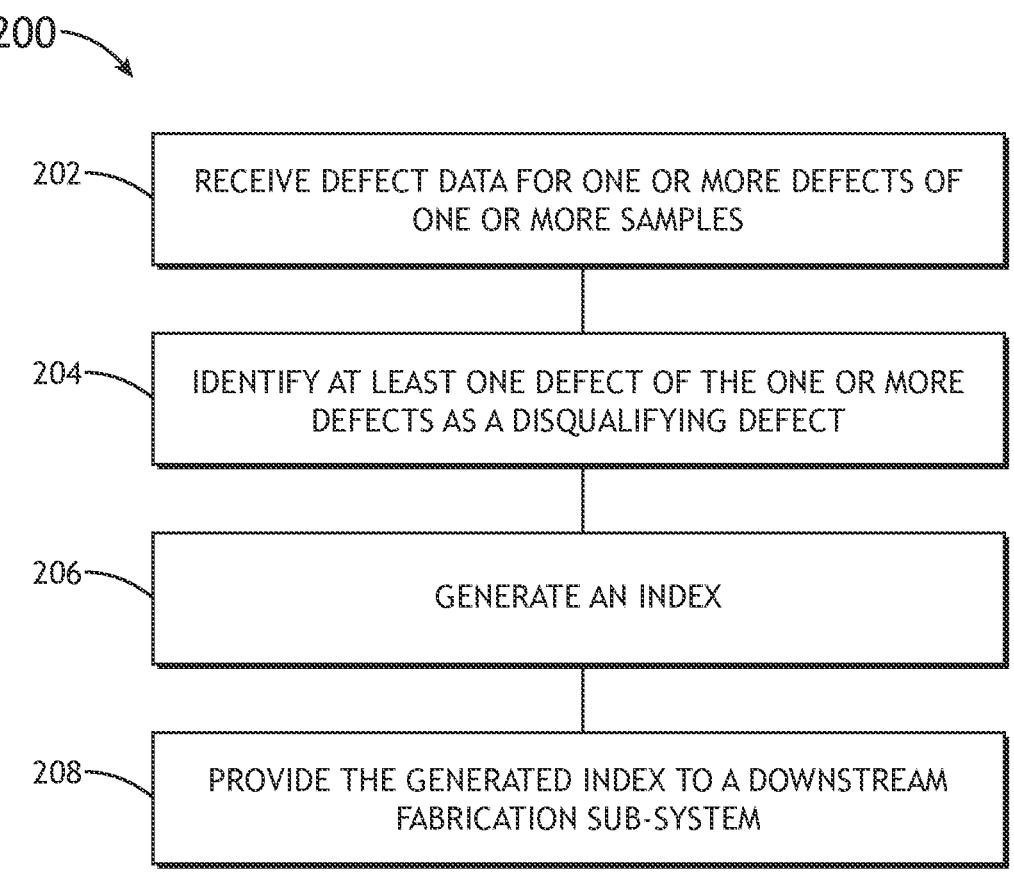
FIG. 2 illustrates a flow diagram depicting a method of mitigating defects within the system, in accordance with one or more embodiments of the present disclosure.

FIG. 2 illustrates a flow diagram depicting a method 200 for defect detection using the system 100, in accordance with one or more embodiments of the present disclosure. FIG. 3 illustrates a process flow diagram depicting the method 200 for defect detection using the system 100, in accordance with one or more embodiments of the present disclosure.

In a step 202, defect data for one or more defects of the one or more samples 112 may be acquired. For example, the controller 106 may be configured to acquire one or more inspection images 101 of the one or more samples 112 from the inspection sub-system 102. For instance, the one or more inspection images 101 may include defect data such as, but not limited to, a defect location, a defect size, a defect shape, a relationship between the defect and a particular component of the sample, and the like.

Referring to FIG. 3, in embodiments, the one or more samples 112 includes a panel 300 including one or more arrays 302 of samples 304. For example, the panel 300 may include one or more arrays 302 of printed circuit boards (PCBs) 304. The one or more arrays 302 of PCBs 304 may be arranged in a column/row configuration. For instance, as shown in FIG. 3, the one or more arrays 302 of PCBs 304 may include a first column (e.g., Column A) of PCBs, a second column (e.g., Column B) PCBs, a third column (e.g., Column C) of PCBs, a fourth column (e.g., Column D) of PCBs, a fifth column (e.g., Column E) of PCBs, up to an N number of columns of PCBs. Each column (e.g., Columns A-E) may include a row (e.g., Row 1-5) of five PCBs. It is noted herein that FIG. 3 is provided merely for illustrative purposes shall not be construed as limiting the scope of the present disclosure.

In a step 204, the one or more defects may be analyzed to determine whether the one or more defects are disqualifying defects. For example, the controller 106 may be configured to identify at least one of the one or more defects as a disqualifying defect (e.g., killer defect) based on the received defect data and one or more predetermined thresholds. By way of another example, the controller 106 may be configured to identify at least one of the one or more defects as a non-disqualifying defect (e.g., pass defect).

Referring to FIG. 3, in a non-limiting example, the controller 106 may be configured to analyze the sample 304*a* positioned in Column D/Row 3 as a killer defect 300*a*, such that the defect 300*a* may disqualify the sample 304*a* located in Column D/Row 3 on the panel 300. Further, the controller 106 may be configured to analyze the sample 304*b* positioned in Column E/Row 4 as a pass defect 300*b*, such that the defect 300*b* does not disqualify the sample 304*b* located in Column E/Row 4 on the panel 300.

In embodiments, the one or more predetermined thresholds include one or more user-defined thresholds. For example, the one or more user-defined thresholds may include one or more user-defined limits such as, but not limited to, minimum defect size, defect location, defect type, critical design area, critical design pattern, and the like.

In a step 206, upon identifying the at least one defect as a disqualifying defect, a tool readable index may be generated. For example, the controller 106 may be configured to generate a tool readable index including, but not limited to, a unit number, a unit location, a panel serial number, a barcode identifier (ID), or the like.

In embodiments, the generated tool readable index is configured to cause one or more downstream fabrication sub-systems 104 to adjust one or more downstream fabrication steps to cut off the defected area from the one or more downstream fabrication steps. For example, the one or more downstream fabrication sub-systems 104 may be configured to avoid applying one or more fabrication steps for the defected area. By way of another example, the one or more downstream fabrication sub-systems 104 may be configured to alter a design of the specified panel including the defected area.

Referring again to FIG. 3, in a non-limiting example, the generated tool readable index may be configured to cause one or more downstream fabrication sub-systems 104 to adjust one or more downstream fabrication steps of the sample 304*a* including the disqualifying killer defect 300*a*. In this regard, the one or more downstream fabrication sub-systems 104 may cut off the sample 304*a* from the downstream fabrication steps based on the generated tool readable index, where the generated tool readable index may cause the one or more downstream fabrication sub-systems 104 to adjust one or more processes based on the identified disqualifying defect.

In a step 208, the generated tool readable index may be provided to the one or more downstream fabrication sub-systems. For example, the controller 106 may be configured to provide the generated tool readable index to the one or more downstream fabrication sub-systems 104.

Referring again to FIG. 3, the controller 106 may be configured to provide the generated tool readable index to a fabrication controller communicatively coupled to the one or more downstream fabrication sub-systems 104. For example, the fabrication controller may be configured to generate one or more communication protocols configured to cause the one or more downstream fabrication tools to adjust the one or more downstream fabrication steps corresponding to the disqualifying defect based on the generated tool readable index and generated one or more communication protocols.

The one or more communication protocols may include, but are not limited to, one or more exposure files, one or more transmission control protocols/internet protocols (TCPs/IPs), one or more table databases, one or more secure file transfer protocols (SFTPs), one or more internet message access protocols (IMAPs), one or more semiconductor equipment communication standards/generic model for communications and control of manufacturing equipment (SECS/GEM) protocols, or the like.

In one non-limiting example, the controller 106 may be configured to provide the generated tool readable index to a computer assisted machine (CAM) station located before the one or more downstream fabrication sub-systems 104 (e.g., laser direct imaging (LDI) tool). In this example, the CAM controller may be configured to generate one or more exposure files configured to cause the LDI tool to adjust one or more downstream fabrication steps corresponding to the disqualifying defect based on the generated tool readable index and the generated one or more exposure files. In this regard, the CAM station may be configured to adapt the exposure file of the LDI tool. The adapted exposure file may be provided to the LDI tool to cause the LDI tool to change the LDI process according to the specific tool readable index, thereby cutting off the defected sample from the LDI process. The adapted exposure file may include samples that are fully printed and samples that are fully empty. For example, as shown in FIG. 3, the panel 300 may include exposure areas 308 and empty exposure areas 310 based on the tool readable index. In this regard, the empty exposure areas 310 may correspond to the location of the killer defect 300*a* on the disqualified sample 300*a*. The exposures areas 308 may include areas with no defects and/or areas with pass defects (e.g., exposure area 312 including the pass defect 300*b*).

Referring again to FIG. 1, the one or more processors 112 of controller 106 may include any processing element known in the art. In this sense, the one or more processors 112 may include any microprocessor-type device configured to execute algorithms and/or instructions. In one embodiment, the one or more processors 112 may consist of a desktop computer, mainframe computer system, workstation, image computer, parallel processor, or any other computer system (e.g., networked computer) configured to execute a program configured to operate the system 100, as described throughout the present disclosure. It is further recognized that the term "processor" may be broadly defined to encompass any device having one or more processing elements, which execute program instructions from a non-transitory memory medium 114. Therefore, the above description should not be interpreted as a limitation on the present invention but merely an illustration.

The memory medium 110 may include any storage medium known in the art suitable for storing program instructions executable by the associated one or more processors 108. By way of a non-limiting example, the memory medium 110 may include a non-transitory memory medium.

By way of additional non-limiting examples, the memory medium 110 may include, but is not limited to, a read-only memory, a random access memory, a magnetic or optical memory device (e.g., disk), a magnetic tape, a solid state drive and the like. It is further noted that memory 110 may be housed in a common controller housing with the one or more processors 108. In an alternative embodiment, the memory 110 may be located remotely with respect to the physical location of the one or more processors 108 and controller 106. For instance, the one or more processors 108 of controller 106 may access a remote memory (e.g., server), accessible through a network (e.g., internet, intranet and the like).

It is further contemplated that each of the embodiments of the method described above may include any other step(s) of any other method(s) described herein. In addition, each of the embodiments of the method described above may be performed by any of the systems described herein.

One skilled in the art will recognize that the herein described components operations, devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components, operations, devices, and objects should not be taken as limiting.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected," or "coupled," to each other to achieve the desired functionality, and any two components capable of being so associated can also be viewed as being "couplable," to each other to achieve the desired functionality. Specific examples of couplable include but are not limited to physically mateable and/or physically interacting components and/or wirelessly interactable and/or wirelessly interacting components and/or logically interacting and/or logically interactable components.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," and the like). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, and the like" is used, in general such a construction is intended in the sense one having skill in the art would understand the convention (e.g., "a system having at least one of A, B, and C" would include, but not be limited to, systems that have A alone, B alone, C alone, A and B together, A and C together, B and C together, and/or A, B, and C together, and the like). In those instances where a convention analogous to "at least one of A, B, or C, and the like" is used, in general such a construction is intended in the sense one having skill in the art would understand the convention (e.g., "a system having at least one of A, B, or C" would include, but not be limited to, systems that have A alone, B alone, C alone, A and B together, A and C together, B and C together, and/or A, B, and C together, and the like). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A system, the system comprising:
   a characterization sub-system configured to perform inspection of one or more samples to generate defect data for one or more defects of the one or more samples; and
   one or more controllers communicatively coupled to the characterization sub-system, the one or more controllers including one or more processors configured to execute a set of program instructions stored in memory, the set of program instructions configured to cause the one or more processors to:
   receive the defect data from the characterization sub-system, the defect data including one of a defect location, a defect size, a defect shape, or a relationship between the defect and a component of the one or more samples;
   identify at least one defect of the one or more defects as a disqualifying defect based on the received defect data and one or more predetermined thresholds;
   upon identifying the defect as a disqualifying defect, generate a tool readable index, the generated tool readable index configured to cause one or more downstream fabrication tools to adjust one or more downstream fabrication steps corresponding to the disqualifying defect based on the generated tool readable index; and
   provide the generated tool readable index to a fabrication controller communicatively coupled to the one or more downstream fabrication tools, the fabrication controller configured to generate one or more communication protocols based on the generated tool readable index and to transmit the one or more communication protocols to the one or more downstream fabrication tools to cause the one or more downstream fabrication tools to adjust the one or more downstream fabrication steps corresponding to the disqualifying defect based on the generated tool readable index and the generated one or more communication protocols.

2. The system of claim 1, wherein the tool readable index includes an identifier configured to be decoded by the one or more downstream fabrication tools.

3. The system of claim 2, wherein the identifier includes a barcode.

4. The system of claim 1, wherein the one or more downstream fabrication tools includes at least one of:
   a photolithography tool, a laser direct imaging tool, an etching tool, a drilling tool, a solder mask printing tool, or a computer-aided manufacturing design tool.

5. The system of claim 1, wherein the one or more communication protocols include one or more exposure files, wherein the generated one or more exposure files includes fully exposed areas and empty exposure areas.

6. The system of claim 1, wherein the one or more predetermined thresholds include one or more user-defined thresholds.

7. The system of claim 6, wherein the or more user-defined thresholds include at least one of:
   a minimum defect size, a defect location, a defect type, a critical design area, or a critical design pattern.

8. The system of claim 1, wherein the one or more samples includes one or more printed circuit boards.

9. The system of claim 8, wherein the one or more printed circuit boards are arranged in one or more arrays on a panel.

10. The system of claim 1, wherein the characterization sub-system includes an inspection sub-system.

11. The system of claim 10, wherein the inspection sub-system includes an automated optical inspection sub-system.

12. A system, the system comprising:
   one or more controllers including one or more processors configured to execute a set of program instructions stored in memory, the set of program instructions configured to cause the one or more processors to:

receive defect data from a characterization sub-system, the defect data including one of a defect location, a defect size, a defect shape, or a relationship between a defect and a component of one or more samples;

identify at least one defect of the one or more defects as a disqualifying defect based on the received defect data and one or more predetermined thresholds;

upon identifying the defect as a disqualifying defect, generate a tool readable index, the tool readable index configured to cause one or more downstream fabrication tools to adjust one or more downstream fabrication steps corresponding to the disqualifying defect based on the generated index; and provide the generated tool readable index to a fabrication controller communicatively coupled to the one or more downstream fabrication tools, the fabrication controller configured to generate one or more communication protocols based on the generated tool readable index and to transmit the one or more communication protocols to the one or more downstream fabrication tools to cause the one or more downstream fabrication tools to adjust the one or more downstream fabrication steps corresponding to the disqualifying defect based on the generated tool readable index and the generated one or more communication protocols.

13. The system of claim 12, wherein the tool readable index includes an identifier configured to be decoded by the one or more downstream fabrication tools.

14. The system of claim 12, wherein the downstream fabrication tool includes at least one of:

a photolithography tool, a laser direct imaging tool, an etching tool, a drilling tool, a solder mask printing tool, or a computer-aided manufacturing design tool.

15. The system of claim 12, wherein the one or more predetermined thresholds include one or more user-defined thresholds.

16. The system of claim 15, wherein the or more user-defined thresholds include at least one of:

a minimum defect size, a defect location, a defect type, a critical design area, or a critical design pattern.

17. The system of claim 12, wherein the one or more samples includes one or more printed circuit boards arranged in one or more arrays on a panel.

18. A method, the method comprising:

receiving defect data for one or more defects of one or more samples from a characterization sub-system, the defect data including one of a defect location, a defect size, a defect shape, or a relationship between the defect and a component of the one or more samples;

identifying at least one defect of the one or more defects as a disqualifying defect based on the received defect data and one or more predetermined thresholds;

upon identifying the defect as a disqualifying defect, generating a tool readable index, the generated tool readable index configured to cause one or more downstream fabrications tool to adjust one or more downstream fabrication steps corresponding to the disqualifying defect based on the generated tool readable index; and providing the generated tool readable index to a fabrication controller communicatively coupled to the one or more downstream fabrication tools, the fabrication controller configured to generate one or more communication protocols based on the generated tool readable index and to transmit the one or more communication protocols to the one or more downstream fabrication tools to cause the one or more downstream fabrication tools to adjust the one or more downstream fabrication steps corresponding to the disqualifying defect based on the generated tool readable index and the generated one or more communication protocols.

* * * * *